(12) United States Patent
Zhang et al.

(10) Patent No.: US 9,582,862 B2
(45) Date of Patent: Feb. 28, 2017

(54) DIRECTION-ADAPTIVE IMAGE DEBLURRING METHOD

(71) Applicant: HUAZHONG UNIVERSITY OF SCIENCE AND TECHNOLOGY, Wuhan, Hubei (CN)

(72) Inventors: Tianxu Zhang, Hubei (CN); Gang Zhou, Hubei (CN); Ao Zhong, Hubei (CN); Liangliang Wang, Hubei (CN); Ming Li, Hubei (CN); Cen Lu, Hubei (CN); Wen Zhang, Hubei (CN); Zhiyong Zuo, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/022,872

(22) PCT Filed: Feb. 10, 2015

(86) PCT No.: PCT/CN2015/072665
§ 371 (c)(1),
(2) Date: Mar. 17, 2016

(87) PCT Pub. No.: WO2016/106951
PCT Pub. Date: Jul. 7, 2016

(65) Prior Publication Data
US 2016/0321788 A1 Nov. 3, 2016

(30) Foreign Application Priority Data

Dec. 30, 2014 (CN) .......................... 2014 1 0844605

(51) Int. Cl.
*G06T 5/00* (2006.01)

(52) U.S. Cl.
CPC ................ *G06T 5/003* (2013.01); *G06T 5/00* (2013.01); *G06T 2207/20004* (2013.01)

(58) Field of Classification Search
CPC .................................. G06T 5/00; G06T 5/003
See application file for complete search history.

(56) References Cited

FOREIGN PATENT DOCUMENTS

| CN | 101540043 | 9/2009 |
| CN | 102147915 | 8/2011 |

(Continued)

OTHER PUBLICATIONS

Setzer et al., "Deblurring Poissonian images by split Bregman techniques," J. Vis. Commun. Image R., vol. 21 2010), p. 193-199.*

(Continued)

*Primary Examiner* — Bhavesh Mehta
*Assistant Examiner* — Menatoallah Youssef
(74) *Attorney, Agent, or Firm* — Hamre, Schumann, Mueller & Larson, P.C.

(57) ABSTRACT

The invention discloses a direction-adaptive image deblurring method, comprising steps of: (1) defining a minimum cost function for deblurring an image by direction-adaptive total variation regularization; (2) converting the unconstrained minimization problem in step (1) to a constrained problem by auxiliary variables $d_1 = Hu$, $d_2 = \nabla_x u$ and $d_3 = \nabla_y u$; (3) obtaining a new minimum cost function from the constrained problem in step (2) by introducing penalty terms; and (4) converting the minimization problem in step (3) to an alternating minimization problem about u, $d_1$, $d_2$ and $d_3$, where a minimum of a variable is calculated as other variables are determined, and obtaining a deblurred image by solving the alternating minimization problem by an alternative and iterative minimization process. Compared with the prior art, the present invention obtains a new direction-adaptive cost function by introducing local direction information into a maximum a posteriori algorithm, solves a problem of edges of an image restored by traditional TV regularization terms being blurred, and can restore (Continued)

images of complex blurring types or images with abundant textures.

10 Claims, 3 Drawing Sheets

(56) References Cited

FOREIGN PATENT DOCUMENTS

| | | |
|---|---|---|
| CN | 102184533 | 9/2011 |
| CN | 102222320 | 10/2011 |
| CN | 102354395 | 2/2012 |
| CN | 102682437 | 9/2012 |
| CN | 103914818 | 7/2014 |
| CN | 104036473 | 9/2014 |
| CN | 104134196 | 11/2014 |
| WO | 2013148139 | 10/2013 |

OTHER PUBLICATIONS

Zhang, Chongyang, et al. "Improved image deblurring based on salient-region segmentation." Signal Processing: Image Communication 28.9 (2013): 1171-1186.*
International Search Report for international application No. PCT/CN2015/072665, dated Sep. 30, 2015 (6 pages, including English translation).
C. Fu et al., "Blind restoration of turbulence-degraded image using maximum entropy algorithm," Infrared and Laser Engineering, vol. 37, No. 3 (2008), p. 542-546 (with English abstract).
C. He et al., "Turbulence-degraded Infrared Image Blind Restoration Method Based on Generalized Regularization," Infrared Technology, vol. 28, No. 8 (2006), p. 443-445 (with English abstract).
S. Setzer et al., "Deblurring Poissonian images by split Bregman techniques," J. Vis. Commun. Image R., vol. 21 (2010), p. 193-199.
J. Wang et al., "Total Variant Image Deblurring Based on Split Bregman Method," Acta Electronica Sinica, vol. 40, No. 8 (2012), p. 1503-1508 (with English abstract).

* cited by examiner

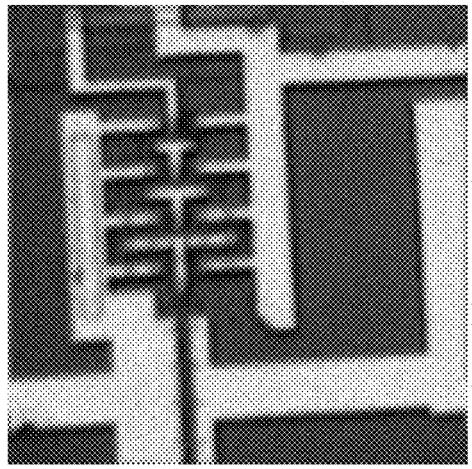
FIG. 3(a)
FIG. 3(b)
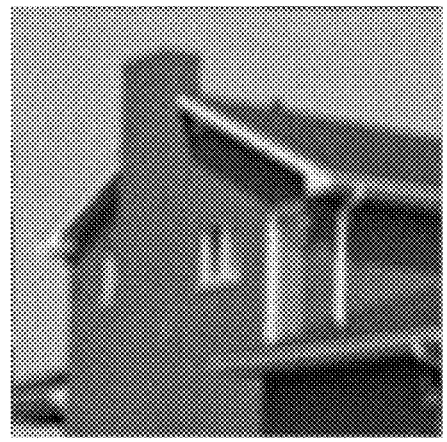
FIG. 3(c)
FIG. 3(d)
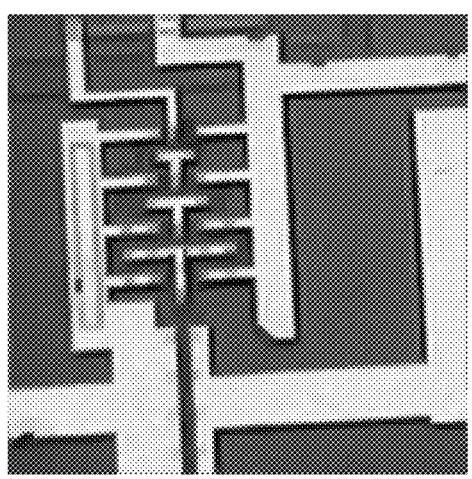
FIG. 4(a)
FIG. 4(b)

DIRECTION-ADAPTIVE IMAGE DEBLURRING METHOD

FIELD OF THE INVENTION

The invention relates to a cross field of aerospace and image processing, and more particularly to a direction-adaptive image deblurring method mainly applicable for image deblurring in remote imaging.

BACKGROUND OF THE INVENTION

Spacial targets such as communication satellites and resources satellites launched at home and abroad can be used in network communication, aerophotography, geodesy, etc. Targets in images obtained by sensors tend to be blurred due to limited spacial resolution of a camera and interference of random noise and atmospheric turbulence with a remote optical imaging system, which makes post operations such as target positioning and target categorizing quite difficult, and therefore, how to improve imaging quality of the images becomes a focus of research both at home and abroad. Intensive studies on deblurring algorithms on targets under the above imaging conditions have been carried out and relevant achievements have been made. For example, Turbulence-degraded Infrared Image Blind Restoration Method Based on Generalized Regularization, He Chengjian, Hong Hanyu and Zhang Tianxu, Infrared Technology, No. 8, Vol. 28, August 2006, proposes a generalized regularization method developed from a conventional nonlinear regularization which can realize correction effectively. However, the method mainly targets at infrared imaging in turbulence and correction on remote visible imaging is not covered. Blind Restoration of Turbulend-degraded Image Using Maximum Entropy Algorithm, Fu Changjun, Xu Dong and Zhao Yan, Infrared and Laser Engineering, No. 3 Vol 37, June 2008, approximates a nonlinear entropy expression by a two order polynomial to avoid complex computations caused by nonlinearity of maximum entropy regularized terms. Theoretical analysis shows accuracy of the approximation can be assured by density transformation and the problem can be solved by a conjugate method which needs less computation. Deblurring Poissonian Images by Split Bregman Techniques, S. Setzer, G. Steidl and T. Teuber, J. Vis. Commun. Image R. 21 (2010) 193~199 proposes a rapid image deblurring method based on split Bregman techniques which can only improve velocity of the algorithm and fails to improve correction quality of the images.

SUMMARY OF THE INVENTION

In view of the above-mentioned problems, it is an objective of the invention to provide a direction-adaptive image deblurring method capable of solving a problem of images being blurred in remote imaging rapidly and effectively with a small amount of computation and excellent adaptability.

To achieve the above objective, there is provided a direction-adaptive image deblurring method, comprising steps of:
(1) defining a minimum cost function for deblurring an image by direction-adaptive total variation regularization as follows:

$$\min_u \langle 1, Hu - f \log(Hu) \rangle + \lambda \| \vec{a} \cdot \nabla u \|_1,$$

where u represents an image to be restored, H is a point spread function, $f$ is a degraded image, $\lambda$ is a regularization parameter and $\lambda > 0$, $\| \vec{a} \cdot \nabla u \|_1$ represents an $l_1$-Norm of a vector $\vec{a} \cdot \nabla u$, $\vec{a}$ is a direction vector and $\vec{a} = (a_1, a_2)$, $\nabla u$ is a gradient operator and $$\nabla u = \begin{pmatrix} \nabla_x u \\ \nabla_y u \end{pmatrix},$$

$\cdot$ is a vector dot product operator, $$\vec{a} \cdot \nabla u = \begin{pmatrix} a_1 \nabla_x u \\ a_2 \nabla_y u \end{pmatrix},$$

$\langle \ \rangle$ is an inner product operator, log is a logarithmic function, and $$\min_u \langle 1, Hu - f \log(Hu) \rangle$$

represents calculating a minimum of an energy function $\langle 1, Hu - f \log(Hu) \rangle$ and outputting a corresponding u;
(2) converting the unconstrained minimization problem in step (1) to a constrained problem by auxiliary variables $d_1$, $d_2$ and $d_3$ as follows:

$$\begin{cases} \min_{u,d_1,d_2,d_3} \langle 1, d_1 - f \log(d_1) \rangle + \lambda \| a_1 d_2 \|_1 + \lambda \| a_2 d_3 \|_1 \\ \text{s.t.} \quad d_1 = Hu, d_2 = \nabla_x u, d_3 = \nabla_y u \end{cases},$$

where $d_1 = Hu$, $d_2 = \nabla_x u$ and $d_3 = \nabla_y u$;
(3) obtaining a new minimum cost function from the constrained problem in step (2) by introducing penalty terms as follows:

$$\min_{u,d_1,d_2,d_3} \langle 1, d_1 - f \log(d_1) \rangle + \lambda \| a_1 d_2 \|_1 + \lambda \| a_2 d_3 \|_1$$
$$+ \frac{\alpha}{2} \| d_1 - Hu \|_2^2 + \frac{\beta}{2} \| d_2 - \nabla_x u \|_2^2 + \frac{\gamma}{2} \| d_3 - \nabla_y u \|_2^2,$$

where $\alpha$, $\beta$ and $\gamma$ are penalty parameters greater than zero; and
(4) converting the minimization problem in step (3) to an alternating minimization problem about u, $d_1$, $d_2$ and $d_3$, where a minimum of a variable is calculated as other variables are determined, and obtaining a deblurred image by solving the alternating minimization problem by an alternative and iterative minimization process.

Compared with the prior art, the present invention obtains a new direction-adaptive cost function by introducing local direction information into a maximum a posteriori (MAP) algorithm, solves a problem of edges of an image restored by traditional TV regularization terms being blurred, and can restore images of complex blurring types or images with abundant textures.

BRIEF DESCRIPTION OF THE ACCOMPANYING DRAWINGS

FIG. 3(a) shows an image with a PSNR of 14.97 obtained from FIG. 2(a) being processed by Gaussian blur with a size of 15*15 and a standard deviation of 1.8 and Poisson noise degradation;

FIG. 3(b) shows an image with a PSNR of 21.88 obtained from FIG. 2(b) being processed by circle blur with a radius of 3 and Poisson noise degradation;

FIG. 3(c) shows an image with a PSNR of 22.22 obtained from FIG. 2(c) being processed by uniform blur with a size of 7*7 and Poisson noise degradation;

FIG. 3(d) shows an image with a PSNR of 23.29 obtained from FIG. 2(d) being processed by random blur with a size of 7*7 and Poisson noise degradation;

FIG. 4(a) shows an image with a PSNR of 19.56 and a regularization parameter $\lambda=5.5666\times10^{-7}$ obtained from FIG. 3(a) being deblurred by the method of the invention;

FIG. 4(b) shows an image with a PSNR of 23.93 and a regularization parameter $\lambda=6.2986\times10^{-7}$ obtained from FIG. 3(b) being deblurred by the method of the invention;

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Various solutions to the problem of image deblurring with respective algorithm features have been developed in prior art. However, the algorithms deduce optimal solutions statistically or approximately merely by certain large-scaled priori features of the images in statistics failing to use small-scaled geometric and structural features of the images such as edge directions and texture directions to constraint and correct the results. Therefore, boundary blur and detail lost often occur in edges of the deblurred images. In view of the above-mentioned problems, there is provided a direction-adaptive image deblurring method introducing small-scaled geometric features (local edge directions) of images into a maximum a posteriori (MAP) algorithm, and solving the problems ahead by alternative and iterative minimization and fast Fourier transformation. Tests show that the method can obtain deblurred images with clear edges and details while features a high computing velocity.

Figure 1:
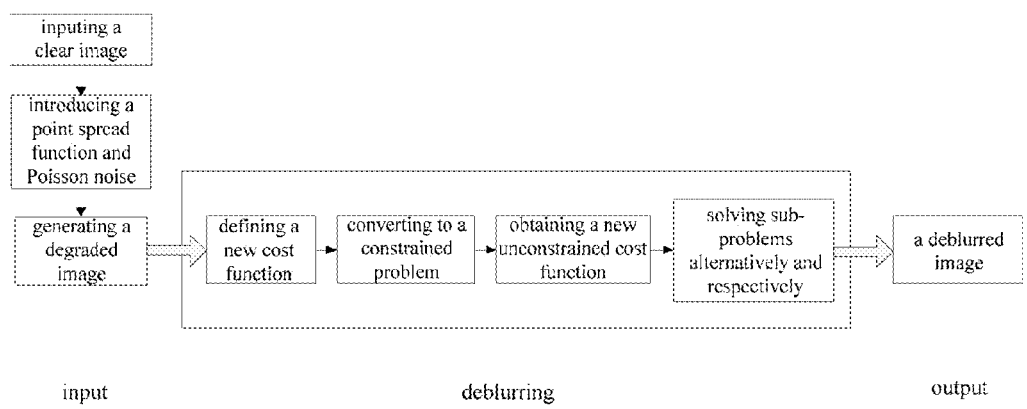
FIG. 1 is a flow chart of a direction-adaptive image deblurring method of the invention.

As in FIG. 1, a direction-adaptive image deblurring method of the invention comprises the following steps of:
(1) defining a minimum cost function for deblurring an image by direction-adaptive total variation (TV) regularization;

In image deblurring, degradation of most images can be considered as a linear process and can be expressed by the following equation:

$$f = Hu + n,$$

where $f$ represents a degraded image, H is a linear operator representing a point spread function deblurring an image, u represents a clear image to be restored, and n is imaging noise.

Non-blind deconvolution of an image is to obtain the clear image u by the degraded image $f$ and the point spread function H. The inverse process of image restoration is morbid, amplifying noises in restoration and making a deburring result unstable. As TV regularization is advantageous in detail restoration, it is used to overcome morbidity in image restoration in the invention. Besides, local edge information is introduced into a maximum a posteriori (MAP) algorithm, and therefore a direction-adaptive image deblurring method is obtained to provide better protection to edges of a restored image.

For an image degraded by Poisson noise, the minimum cost function for deblurring an image by direction-adaptive TV regularization is defined as follows:

$$\min_u \langle 1, Hu - f \log(Hu) \rangle + \lambda \| \vec{a} \cdot \nabla u \|_1,$$

where u represents an image to be restored, H is a point spread function, $f$ is a degraded image, $\lambda$ is a regularization parameter and $\lambda > 0$, $\|x\|_1$ represents an $l_1$-Norm of a vector $$x = (x_1, x_2, \ldots x_n), \ \|x\|_1 = \sum_{i=1}^{i=n} |x_i|, \ |x_i|$$

represents an absolute value of $x_i$, $x_i$ represents the ith component of the vector x, $$\sum_{i=1}^{i=n} |x_i|$$

represents a sum of $|x_i|$, $\vec{a}$ is a direction vector and $\vec{a}=(a_1, a_2)$, $\nabla u$ is a gradient operator and $$\nabla u = \begin{pmatrix} \nabla_x u \\ \nabla_y u \end{pmatrix},$$

· is a vector dot product operator, $$\vec{a} \cdot \nabla u = \begin{pmatrix} a_1 \nabla_x u \\ a_2 \nabla_y u \end{pmatrix},$$

$\langle \ \rangle$ is an inner product operator, log is a logarithmic function, and $$\min_u g(u)$$

represents calculating a minimum of an energy function g(u) and outputting a corresponding u;

The minimum cost function can be expanded as follows:

$$\min_u \langle 1, Hu - f \log(Hu) \rangle + \lambda \|a_1 \nabla_x u\|_1 + \lambda \|a_2 \nabla_y u\|_1.$$

(2) converting the unconstrained minimization problem in step (1) to a constrained problem by auxiliary variables $d_1$, $d_2$ and $d_3$ as follows:

$$\begin{cases} \min_{u,d_1,d_2,d_3} \langle 1, d_1 - f\log(d_1) \rangle + \lambda\|a_1 d_2\|_1 + \lambda\|a_2 d_3\|_1 \\ \text{s.t. } d_1 = Hu, d_2 = \nabla_x u, d_3 = \nabla_y u \end{cases},$$

where $d_1 = Hu$, $d_2 = \nabla_x u$ and $d_3 = \nabla_y u$;

(3) obtaining a new minimum cost function from the constrained problem in step (2) by introducing penalty terms as follows:

$$\min_{u,d_1,d_2,d_3} \langle 1, d_1 - f\log(d_1) \rangle + \lambda\|a_1 d_2\|_1 + \lambda\|a_2 d_3\|_1 +$$
$$\frac{\alpha}{2}\|d_1 - Hu\|_2^2 + \frac{\beta}{2}\|d_2 - \nabla_x u\|_2^2 + \frac{\gamma}{2}\|d_3 - \nabla_y u\|_2^2,$$

where $\alpha$, $\beta$ and $\gamma$ are penalty parameters greater than zero; and (4) converting the minimization problem in step (3) to an alternating minimization problem about u, $d_1$, $d_2$ and $d_3$, where a minimum of a variable is calculated as other variables are determined, and obtaining a deblurred image by solving the alternating minimization problem by an alternative and iterative minimization process.

The alternating minimization problem further comprises:
(4.1) a sub-problem about u:

$$u^{k+1} = \arg\min_u \left\{ \frac{\alpha}{2}\|d_1^k - Hu^k\|_2^2 + \frac{\beta}{2}\|d_2^k - \nabla_x u^k\|_2^2 + \frac{\gamma}{2}\|d_3^k - \nabla_y u^k\|_2^2 \right\};$$

(4.2) a sub-problem about $d_1$:

$$d_1^{k+1} = \arg\min_{d_1} \left\{ \langle 1, d_1^k - f\log(d_1^k) \rangle + \frac{\alpha}{2}\|d_1^k - Hu^{k+1}\|_2^2 \right\};$$

(4.3) a sub-problem about $d_2$:

$$d_2^{k+1} = \arg\min_{d_2} \left\{ \lambda\|a_1 d_2^k\|_1 + \frac{\beta}{2}\|d_2^k - \nabla_x u^{k+1}\|_2^2 \right\};$$

and
(4.4) a sub-problem about $d_3$:

$$d_3^{k+1} = \arg\min_{d_3} \left\{ \lambda\|a_2 d_3^k\|_1 + \frac{\gamma}{2}\|d_3^k - \nabla_x u^{k+1}\|_2^2 \right\}.$$

In sub-problems (4.1) and (4.2), as the functions are differentiable, u and $d_1$ are solved by partial differentiation and fast Fourier transformation as follows:

$$u^{k+1} = \text{real}\left( FFT^{-1}\left( \frac{FFT[\alpha H^T(d_1^k) + \beta \nabla_x^T(d_2^k) + \gamma \nabla_y^T(d_3^k)]}{FFT(\alpha H^T H + \beta \nabla_x^T \nabla_x + \gamma \nabla_y^T \nabla_y)} \right) \right),$$

$$d_1^{k+1} = \frac{1}{2}\left( Hu^{k+1} - \frac{1}{\alpha} + \sqrt{\left(Hu^{k+1} - \frac{1}{\alpha}\right)^2 + \frac{4f}{\alpha}} \right),$$

where FFT represents fast Fourier transformation, $FFT^{-1}$ represents inverse fast Fourier transformation, real represents real part of a complex, $\nabla_x^T$ represents transposition of $\nabla_x$, $H^T$ represents conjugation of H, and superscript k is a sequence number of iteration.

Sub-problems (4.3) and (4.4) are solved by 2D shrink operators directly as follows:

$$d_2^{k+1} = \frac{\nabla_x u^{k+1}}{|\nabla_x u^{k+1}|} \max\left(|\nabla_x u^{k+1}| - \frac{a_1 \lambda}{\beta}, 0\right),$$

$$d_3^{k+1} = \frac{\nabla_y u^{k+1}}{|\nabla_y u^{k+1}|} \max\left(|\nabla_y u^{k+1}| - \frac{a_2 \lambda}{\gamma}, 0\right),$$

where $\alpha = \beta = \gamma = 1$, direction vector $\vec{a} = (|\cos(\theta)|, |\sin(\theta)|)$, cos is a cosine function, sin is a sine function, max(X, Y) represents a maximum of X and Y, $$\theta = \frac{1}{2}\tan^{-1}\left( \frac{\sum_w 2\nabla_x u^{k+1} \nabla_y u^{k+1}}{\sum_w [(\nabla_x u^{k+1})^2 - (\nabla_y u^{k+1})^2]} \right) + \frac{\pi}{2},$$

$\tan^{-1}$ is an arctangent function, $\pi$ is circumference ratio, w is an integer greater than 1, $\Sigma_w$ is sum of an area of w×w with a current point in the center, and w=5 in one embodiment of the invention.

Obtaining a deblurred image by solving the alternating minimization problem by an alternative and iterative minimization process in step (4) further comprises:
1. initializing the image to be restored by $$u^0 = \frac{f}{\text{sum}(f)}$$

and $d_1^0 = d_2^0 = d_3^0 = 0$;
2. initializing a point spread function;
3. initializing a maximum iteration frequency kMax=100 and an iteration frequency k=0;
4. while (k<kMax)
5. updating the iteration frequency by k=k+1;
6. updating the image to be restored by calculating $u^k$ in sub-problem (4.1) in step (4);
7. updating the auxiliary variable by calculating $d_1^k$ in sub-problem (4.2) in step (4);
8. updating the auxiliary variable by calculating $d_2^k$ in sub-problem (4.3) in step (4);
9. updating the auxiliary variable by calculating $d_3^k$ in sub-problem (4.4) in step (4);
10. calculating Peak Signal to Noise Ratio of the updated image to be restored $u^k$;
11. end
sum(f) is a sum of gray values of the degraded image $f$. In image deblurring, the point spread function is supposed to be known, the maximum iteration frequency is initialized to be 100, and an image corresponding to a maximum PSNR is output as a final clear image.

PSNR of an image $u^k$ output after the kth iteration is calculated by the following equation:

$$PSNR(I, u^k) = 10\log_{10}\frac{\max(I)^2}{\sum_{s=1}^{M}\sum_{t=1}^{N}[I(s,t) - u^k(s,t)]^2},$$

where I represents a clear reference image, and max(I) represents a maximum gray value of I.

Figure 2A:
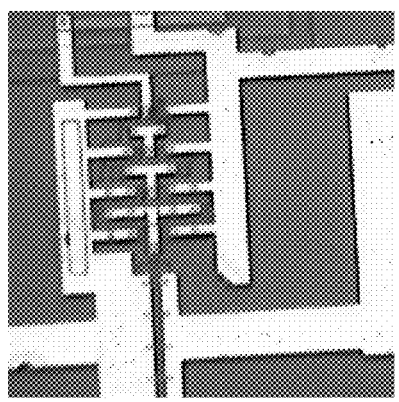
FIG. 2(a) shows a clear image of a circuit in one embodiment of the invention.

For better understanding of the algorithm for those skilled in the art, different images are deblurred in simulation. FIG. 2(a) shows a clear image of a circuit in one embodiment of the invention, FIG. 2(b) shows a clear image of a cameraman in one embodiment of the invention, FIG. 2(c) shows a clear CT image of a liver in one embodiment of the invention, and FIG. 2(d) shows a clear image of a house in one embodiment of the invention.

FIG. 3(a) shows an image with a PSNR of 14.97 obtained from FIG. 2(a) being processed by Gaussian blur with a size of 15*15 and a standard deviation of 1.8 and Poisson noise degradation.

Figure 2B:
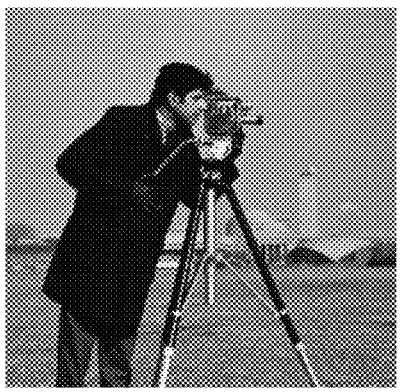
FIG. 2(b) shows a clear image of a cameraman in one embodiment of the invention.

FIG. 3(b) shows an image with a PSNR of 21.88 obtained from FIG. 2(b) being processed by circle blur with a radius of 3 and Poisson noise degradation.

Figure 2C:
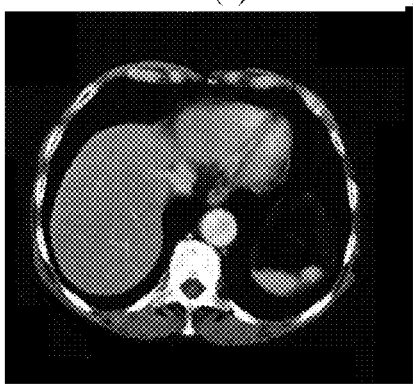
FIG. 2(c) shows a clear CT image of a liver in one embodiment of the invention.
Figure 2D:
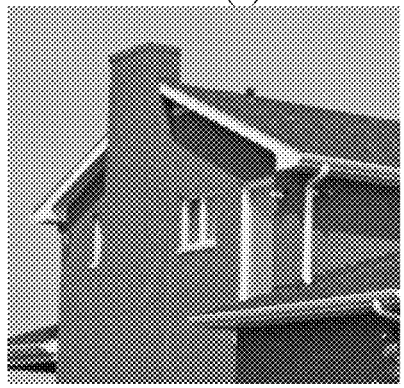
FIG. 2(d) shows a clear image of a house in one embodiment of the invention.

FIG. 3(c) shows an image with a PSNR of 22.22 obtained from FIG. 2(c) being processed by uniform blur with a size of 7*7 and Poisson noise degradation.

FIG. 3(d) shows an image with a PSNR of 23.29 obtained from FIG. 2(d) being processed by random blur with a size of 7*7 and Poisson noise degradation.

In one embodiment, the point spread function is as follows:

$$PSF = \begin{bmatrix} 0 & 1 & 1 & 1 & 1 & 0 & 0; \\ 1 & 1 & 0 & 0 & 0 & 1 & 0; \\ 0 & 0 & 0 & 0 & 1 & 1 & 0; \\ 0 & 0 & 1 & 1 & 0 & 0 & 0; \\ 0 & 1 & 1 & 0 & 0 & 1 & 1; \\ 0 & 1 & 0 & 0 & 1 & 1 & 0; \\ 0 & 1 & 1 & 1 & 1 & 0 & 0 \end{bmatrix} / 22.$$

FIG. 4(a) shows an image with a maximum PSNR of 19.56 while k=63 and a regularization parameter $\lambda=5.5666\times 10^{-7}$ obtained from FIG. 3(a) being deblurred by the method of the invention.

FIG. 4(b) shows an image with a maximum PSNR of 23.93 while k=50 and a regularization parameter $\lambda=6.2986\times 10^{-7}$ obtained from FIG. 3(b) being deblurred by the method of the invention.

Figure 4C:
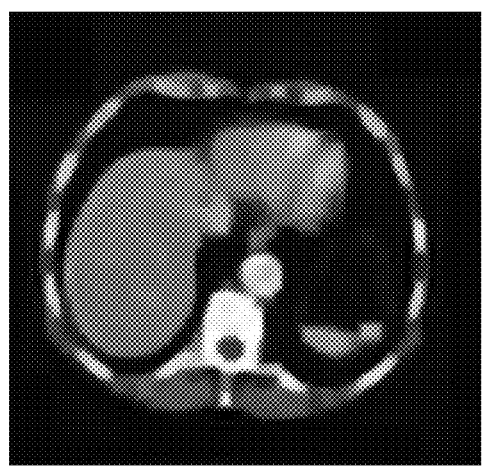
FIG. 4(c) shows an image with a PSNR of 24.71 and a regularization parameter $\lambda=3.3193\times10^{-6}$ obtained from FIG. 3(c) being deblurred by the method of the invention.

FIG. 4(c) shows an image with a maximum PSNR of 24.71 while k=36 and a regularization parameter $\lambda=3.3193\times 10^{-6}$ obtained from FIG. 3(c) being deblurred by the method of the invention.

Figure 4D:
FIG. 4(d) shows an image with a PSNR of 28.32 and a regularization parameter $\lambda=2.7896\times10^{-7}$ obtained from FIG. 3(d) being deblurred by the method of the invention.

FIG. 4(d) shows an image with a maximum PSNR of 28.32 while k=42 and a regularization parameter $\lambda=2.7896\times 10^{-7}$ obtained from FIG. 3(d) being deblurred by the method of the invention.

While preferred embodiments of the invention have been described above, the invention is not limited to disclosure in the embodiments and the accompanying drawings. Any changes or modifications without departing from the spirit of the invention fall within the scope of the invention.

What is claimed is:

1. A direction-adaptive image deblurring method, comprising steps of:
    (1) defining a minimum cost function for deblurring an image by direction-adaptive total variation regularization as follows:

$$\min_{u}\langle 1, Hu - f\log(Hu)\rangle + \lambda\|\vec{a}\cdot\nabla u\|_1,$$

where u represents an image to be restored, H is a point spread function, $f$ is a degraded image, $\lambda$ is a regularization parameter and $\lambda > 0$, $\|\vec{a}\cdot\nabla u\|_1$ represents an $l_1$-Norm of a vector $\vec{a}\cdot\nabla u$, $\vec{a}$ is a direction vector and $\vec{a}=(a_1, a_2)$, $\nabla u$ is a gradient operator and $$\nabla u = \begin{pmatrix} \nabla_x u \\ \nabla_y u \end{pmatrix},$$

· is a vector dot product operator, $$\vec{a}\cdot\nabla u = \begin{pmatrix} a_1\nabla_x u \\ a_2\nabla_y u \end{pmatrix},$$

$\langle\ \rangle$ is an inner product operator, log is a logarithmic function, and $$\min_{u}\langle 1, Hu - f\log(Hu)\rangle$$

represents calculating a minimum of an energy function $\langle 1, Hu-f\log(Hu)\rangle$ and outputting a corresponding u;
    (2) converting the unconstrained minimization problem in step (1) to a constrained problem by auxiliary variables $d_1$, $d_2$, and $d_3$ as follows:

$$\begin{cases} \min_{u,d_1,d_2,d_3}\langle 1, d_1 - f\log(d_1)\rangle + \lambda\|a_1 d_2\|_1 + \lambda\|a_2 d_3\|_1 \\ \text{s.t.}\quad d_1 = Hu, d_2 = \nabla_x u, d_3 = \nabla_y u \end{cases},$$

where $d_1=Hu$, $d_2=\nabla_x u$ and $d_3=\nabla_y u$;
    (3) obtaining a new minimum cost function from the constrained problem in step (2) by introducing penalty terms as follows:

$$\min_{u,d_1,d_2,d_3}\langle 1, d_1 - f\log(d_1)\rangle + \lambda\|a_1 d_2\|_1 + \lambda\\ +\frac{\alpha}{2}a_2 d_3\|_1\ \|d_1 - Hu\|_2^2 + \frac{\beta}{2}\|d_2 - \nabla_x u\|_2^2 + \frac{\gamma}{2}\|d_3 - \nabla_y u\|_2^2,$$

where $\alpha$, $\beta$ and $\gamma$ are penalty parameters greater than zero; and
    (4) converting the minimization problem in step (3) to an alternating minimization problem about u, $d_1$, $d_2$ and $d_3$, where a minimum of a variable is calculated as other variables are determined, and obtaining a deblurred image by solving the alternating minimization problem by an alternative and iterative minimization process.

2. The method of claim 1, where the alternating minimization problem in step (4) further comprises:

(4.1) a sub-problem about u:

$$u^{k+1} = \arg\min_u \left\{ \frac{\alpha}{2} \| d_1^k - Hu^k \|_2^2 + \frac{\beta}{2} \| d_2^k - \nabla_x u^k \|_2^2 + \frac{\gamma}{2} \| d_3^k - \nabla_y u^k \|_2^2 \right\};$$

(4.2) a sub-problem about $d_1$:

$$d_1^{k+1} = \arg\min_{d_1} \left\{ \langle 1, d_1^k - f \log(d_1^k) \rangle + \frac{\alpha}{2} \| d_1^k - Hu^{k+1} \|_2^2 \right\};$$

(4.3) a sub-problem about $d_2$:

$$d_2^{k+1} = \arg\min_{d_2} \left\{ \lambda \| a_1 d_2^k \|_1 + \frac{\beta}{2} \| d_2^k - \nabla_x u^{k+1} \|_2^2 \right\};$$

and (4.4) a sub-problem about $d_3$:

$$d_3^{k+1} = \arg\min_{d_3} \left\{ \lambda \| a_2 d_3^k \|_1 + \frac{\gamma}{2} \| d_3^k - \nabla_y u^{k+1} \|_2^2 \right\}.$$

3. The method of claim 2, where obtaining a deblurred image by solving the alternating minimization problem by an alternative and iterative minimization process in step (4) further comprises:

initializing the image to be restored by $$u^0 = \frac{f}{\text{sum}(f)}$$

and $d_1^0 = d_2^0 = d_3^0 = 0$;

initializing a maximum iteration frequency kMax and an iteration frequency k=0;
determining whether the iteration frequency k is smaller than the maximum iteration frequency kMax, and performing the following iterative operation if yes, and ending iteration if no;
updating the iteration frequency by k=k+1;
updating the image to be restored by calculating $u^k$ in sub-problem (4.1) in step (4);
updating the auxiliary variable by calculating $d_1^k$ in sub-problem (4.2) in step (4);
updating the auxiliary variable by calculating $d_2^k$ in sub-problem (4.3) in step (4);
updating the auxiliary variable by calculating $d_3^k$ in sub-problem (4.4) in step (4); and
calculating Peak Signal to Noise Ratio of the updated image to be restored $u^k$;
selecting an image to be restored corresponding to a maximum PSNR as a final deblurred image to output after the iteration.

4. The method of claim 2, where u in sub-problem (4.1) is solved by partial differentiation and fast Fourier transformation as follows:

$$u^{k+1} = \text{real}\left( FFT^{-1}\left( \frac{FFT[\alpha H^T(d_1^k) + \beta \nabla_x^T(d_2^k) + \gamma \nabla_y^T(d_3^k)]}{FFT(\alpha H^T H + \beta \nabla_x^T \nabla_x + \gamma \nabla_y^T \nabla_y)} \right) \right),$$

where FFT represents fast Fourier transformation, $FFT^{-1}$ represents inverse fast Fourier transformation, real represents real part of a complex, $\nabla_x^T$ represents transposition of $\nabla_x$, $H^T$ represents conjugation of H, and superscript k is a sequence number of iteration.

5. The method of claim 2, where $d_1$ in sub-problem (4.2) is solved by partial differentiation and fast Fourier transformation as follows:

$$d_1^{k+1} = \frac{1}{2}\left( Hu^{k+1} - \frac{1}{\alpha} + \sqrt{\left(Hu^{k+1} - \frac{1}{\alpha}\right)^2 + \frac{4f}{\alpha}} \right),$$

where FFT represents fast Fourier transformation, $FFT^{-1}$ represents inverse fast Fourier transformation, real represents real part of a complex, $\nabla_x^T$ represents transposition of $\nabla_x$, $H^T$ represents conjugation of H, and superscript k is a sequence number of iteration.

6. The method of claim 2, where $d_2$ in sub-problem (4.3) is solved by a 2D shrink operator as follows:

$$d_2^{k+1} = \frac{\nabla_x u^{k+1}}{|\nabla_x u^{k+1}|} \max\left( |\nabla_x u^{k+1}| - \frac{a_1 \lambda}{\beta}, 0 \right),$$

where direction vector $\vec{a} = (|\cos(\theta)|, |\sin(\theta)|)$, cos is a cosine function, sin is a sine function, max(X, Y) represents a maximum of X and Y, $$\theta = \frac{1}{2}\tan^{-1}\left( \frac{\Sigma_w 2\nabla_x u^{k+1} \nabla_y u^{k+1}}{\Sigma_w [(\nabla_x u^{k+1})^2 - (\nabla_y u^{k+1})^2]} \right) + \frac{\pi}{2},$$

$\tan^{-1}$ is an arctangent function, $\pi$ is circumference ratio, w is an integer greater than 1, and $\Sigma_w$ is sum of an area of w×w with a current point in the center.

7. The method of claim 2, where $d_3$ in sub-problem (4.4) is solved by a 2D shrink operator as follows:

$$d_3^{k+1} = \frac{\nabla_y u^{k+1}}{|\nabla_y u^{k+1}|} \max\left( |\nabla_y u^{k+1}| - \frac{a_2 \lambda}{\gamma}, 0 \right),$$

where direction vector $\vec{a} = (|\cos(\theta)|, |\sin(\theta)|)$, cos is a cosine function, sin is a sine function, max(X, Y) represents a maximum of X and Y, $$\theta = \frac{1}{2}\tan^{-1}\left( \frac{\Sigma_w 2\nabla_x u^{k+1} \nabla_y u^{k+1}}{\Sigma_w [(\nabla_x u^{k+1})^2 - (\nabla_y u^{k+1})^2]} \right) + \frac{\pi}{2}$$

$\tan^{-1}$ is an arctangent function, $\pi$ is circumference ratio, w is an integer greater than 1, and $\Sigma_w$ is sum of an area of w×w with a current point in the center.

8. The method of claim 3, where PSNR of $u^k$ is calculated by the following equation:

$$PSNR(I, u^k) = 10\log_{10} \frac{\max(I)^2}{\sum_{s=1}^{M} \sum_{t=1}^{N} [I(s,t) - u^k(s,t)]^2},$$

where I represents a clear reference image, and max(I) represents a maximum gray value of I.

9. The method of claim 6, where $\alpha=\beta=\gamma=1$.
10. The method of claim 6, where w=5.

* * * * *